United States Patent [19]

Boehm et al.

[11] Patent Number: 4,515,544
[45] Date of Patent: May 7, 1985

[54] MOLD PROTECTION DEVICE

[75] Inventors: Russell W. Boehm, Longmont, Colo.; Robert P. Rippstein, Hopewell Junction, N.Y.; David R. Stone, Longmont, Colo.

[73] Assignee: International Business Machines Corporation, Armonk, N.Y.

[21] Appl. No.: 594,666

[22] Filed: Mar. 29, 1984

[51] Int. Cl.³ .............................................. B29F 1/00
[52] U.S. Cl. ................................. 425/129 R; 425/137; 425/154
[58] Field of Search ................... 425/129 R, 137, 154

[56] References Cited

U.S. PATENT DOCUMENTS

| 2,801,442 | 8/1957 | Moslo | 425/137 |
| 3,642,402 | 2/1972 | Hutchinson et al. | 425/144 |
| 3,647,309 | 3/1972 | Thompson | 425/139 |
| 3,726,625 | 4/1973 | Rees | 425/247 |
| 3,825,385 | 7/1974 | Sesto | 425/137 |
| 4,094,621 | 6/1978 | Hehl | 425/190 |
| 4,412,798 | 11/1983 | Avellino | 425/154 X |

FOREIGN PATENT DOCUMENTS 46-2906  1/1971  Japan ................................. 425/137

OTHER PUBLICATIONS

IBM Technical Disclosure Bulletin, "Plastic Molding Apparatus", by A. T. Hardardt and F. B. Zykoff, vol. 10, No. 11, Apr. 1968, pp. 1725-1726.
IBM Technical Disclosure Bulletin, "Hole Position and Orientation Finder", by R. L. Kaftan and R. S. Shryock, vol. 25, No. 7B, Dec. 1982, pp. 3911-3912.

*Primary Examiner*—Thomas P. Pavelko
*Attorney, Agent, or Firm*—Earl C. Hancock; Carl M. Wright

[57] ABSTRACT

Sensor arranged to detect the proper placement and quantity of one or more inserts in the cavity of an injection molding machine. The sensor is preferably formed of a spring-biased plunger through one of the cavity shells. A photodetector monitors the movement of the plunger as the cavity-forming shells are closed and activates an alarm signal if the plunger movement is excessive before detection of proper mold closure.

6 Claims, 7 Drawing Figures

MOLD PROTECTION DEVICE

Technical Field

This invention relates generally to safety controls for equipment closures, and particularly to injection molding machines. More particularly, it relates to injection molding machines using inserts.

Metal inserts are commonly used in injection molding and involve a risk of damage to the tooling or the mold, or both. Frequently, the design of an object to be produced by injection molding requires that two or more insert surfaces in different planes be exposed in the finished product, requiring the mold to close onto the insert. Such a closure condition pinches a steel insert between the halves of the injection mold. The interference fit, i.e., prescribed limits of size of mating parts so that an interference always exists when the parts are assembled between the insert and the tool, must be closely controlled to prevent damaging mold details at the point of contact. The principal causes of damage are inserts that are out-of-tolerance or incorrectly installed.

Inspection of inserts will normally detect out-of-tolerance parts, but the actual installation of the insert in the mold is left to the ability of an operator or the repeatability of an automation device.

Detection of an incorrectly installed insert in a mold without damage to the tooling is often difficult and sometimes impossible using prior art techniques.

BACKGROUND ART

Prior art closure failure detectors include stationary mold platen movement detectors which require relatively large forces to actuate. They typically employ strategically located microswitches external to the mold cavity and positioned relative to the stationary platen. They fail to prevent mold damage from multiple insert feeds or insert placement errors within the mold cavity.

Low pressure close circuits are standard on most injection molding machines. They provide for closing the mold under low pressure and measuring the resistance to closing in order to detect obstructions. These circuits do not normally provide for opening the press when an obstruction is detected and their level of sensitivity is limited by the requirement to overcome the normal resistances of the tool and of the press.

The use of spring-biased plungers for position detection is known in the prior art as exemplified by the literature such as "Hole Position and Orientation Finder," R. L. Kaftan and R. S. Shryock, *IBM TECHNICAL DISCLOSURE BULLETIN*, Vol. 25, No. 7B, December 1982 (pp. 3911–3912). This reference discloses the use of a spring-loaded ball wiggler and plungers coupled to linear variable displacement transducers, the latter function to indicate linear displacement. The wiggler locates a hole. The reference, however, does not show nor suggest the detection of an insert as disclosed in this case.

The use of spring-biased plungers for molded part injection in association with injection molding devices is also known in the art as exemplified by "Plastic Molding Apparatus," A. T. Hardardt and F. B. Zykoff, *IBM TECHNICAL DISCLOSURE BULLETIN*, Vol. 10, No. 11, April 1968 (pp. 1725–1726) which shows a spring-biased ejector pin associated with plastic molding of parts including inserts with the mold cavity. This reference shows a spring-loaded plunger for ejecting the molded item. It does not show nor suggest the claimed invention because it does not detect the presence of an incorrectly placed insert.

U.S. Pat. Nos. 3,726,625 (Rees) and 4,094,621 (Hehl) show arrangements of ejector pin configurations. U.S. Pat. No. 3,642,402 shows the use of pressure transducers in the injection nozzle and mold cavity, respectively. U.S. Pat. No. 3,647,309 shows the use of an ejector bar 36 coupled to a potentiometer 37 to detect the position of the mold elements. These references do not teach nor suggest the claimed invention because they do not show the detection of inserts placed in the mold cavity.

There are several types of mechanical mold protection devices available. Although the details of each may vary, the primary drawback of these systems is their level of sensitivity. The entire tool half must be displaced in order to detect the obstruction. This usually prevents major tool damage at the sacrifice of minor tooling details. They operate on the basic principle of physical displacement of one-half of the tool prior to completion of an electrical circuit by the closing of the mold halves. The two basic types are a spring-loaded fixed platen and a spring-loaded plate attached to a platen.

DISCLOSURE OF THE INVENTION

In accordance with the present invention, an injection molding apparatus having two mold halves and an insert in the mold cavity is fitted with a spring-loaded, plunger-like device in the mold half not having the insert and positioned to engage the insert as the mold halves are closed. The amount of movement of the plunger-like device as the mold halves are closed is detected and an indication is supplied if the insert is not properly positioned within predetermined tolerances.

The invention is particularly useful in the operation of plastic injection molding machines wherein one or more inserts such as metal elements or the like are placed within the mold cavity before the cavity is closed and the plastic is injected to form an integral part with the insert. The inserts are frequently robot-placed although the invention is useful with hand-fed molds as well. If the inserts are incorrectly placed or if multiple inserts are incorrectly located in the cavity, the mold closure will result in damage to the mold, causing the mold production line to be inoperable until the damage is repaired.

DETAILED DESCRIPTION

The invention includes a device incorporated in an injection mold at a specified location which causes it to contact the inserts prior to or just after the contact of ejector return pins normally used in injection molds. The device includes a spring-loaded detection pin of suitable shape for detecting the inserts to be used. The detection pin is positioned perpendicular to the optical axis of a fiber optic transceiver or other suitable optical detector. The detection pin can be installed preferably in the ejector plate or some other separate floating plate. Contact between the detection pin and an insert causes displacement of the pin which is detected by the fiber optics transceiver or its equivalent.

An ejector return bar supplies an electrical signal on contact with the stationary half of the tool by activating a switch. The sequence of the two signals, viz., the detection device signal resulting from contacting an insert and the ejector return signal resulting from contact with the stationary mold half, determines the subsequent action of the press.

Figure 1:
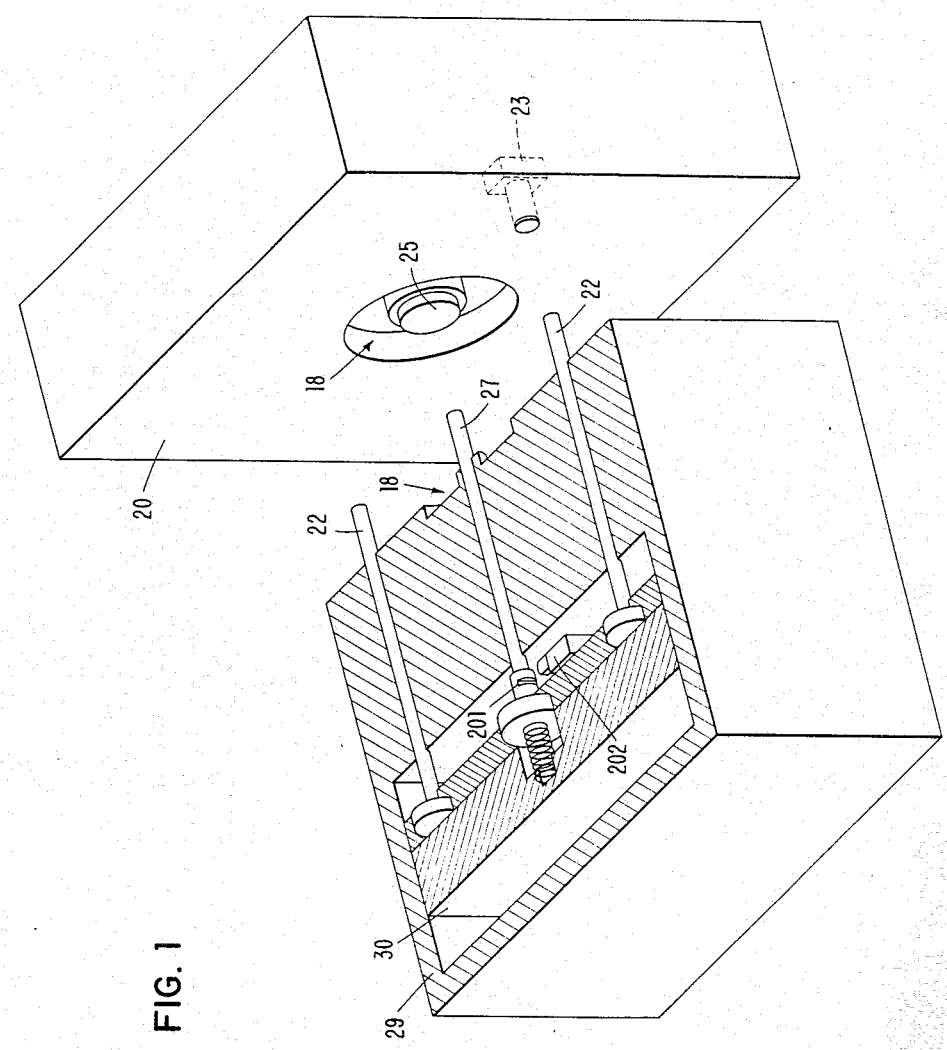
FIG. 1 is an isometric representation of two mold halves in the open position showing the apparatus according to the invention.
Figure 2:
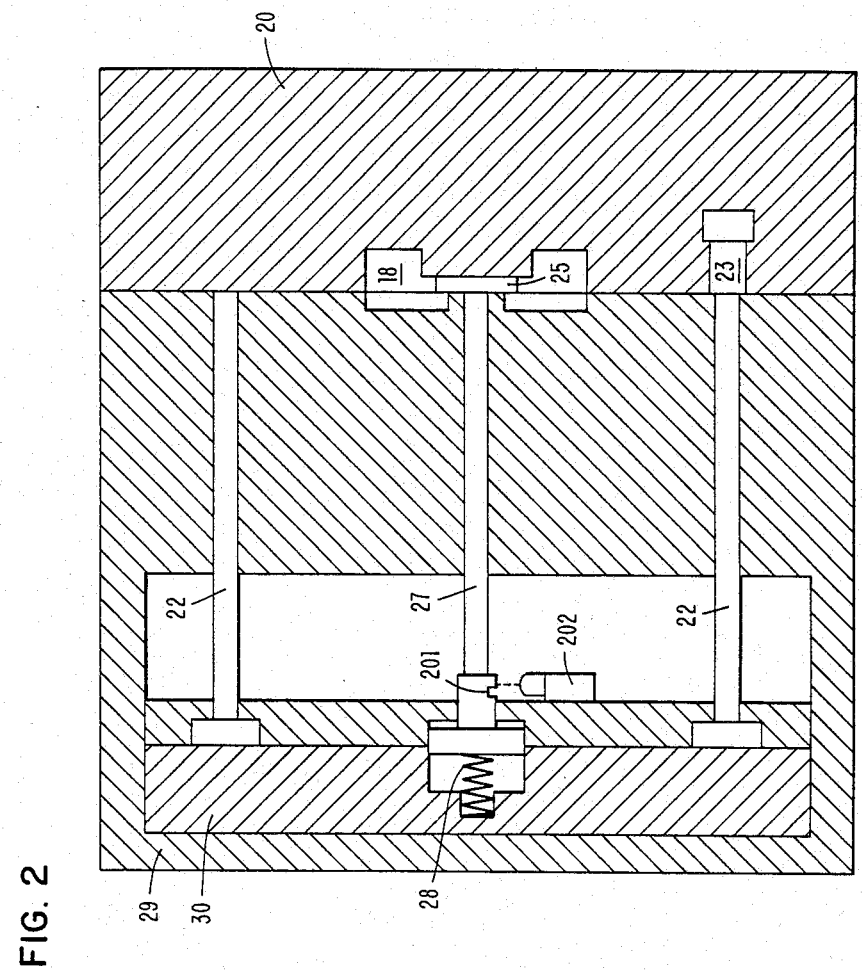
FIG. 2 is a plan view of a closed injection mold with correctly placed inserts.
Figure 3:
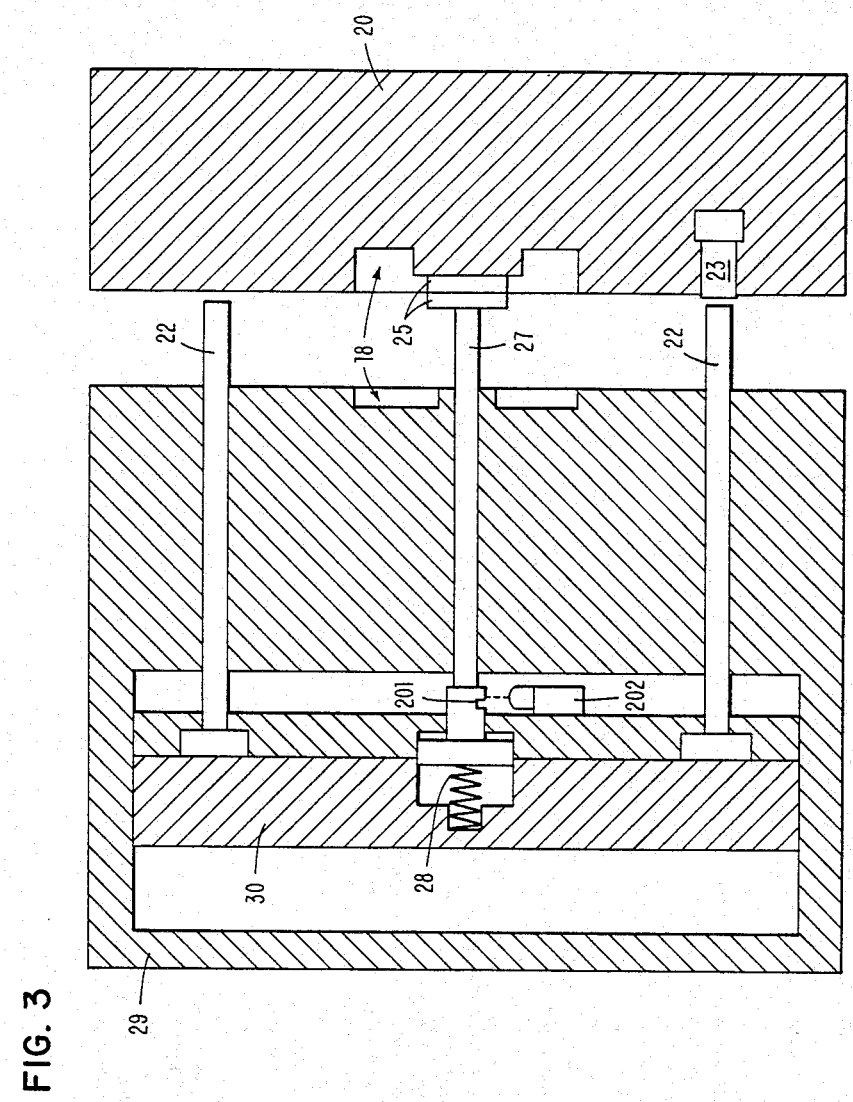
FIG. 3 is a plan view of a partially closed injection mold with incorrect multiple inserts.

Cutaway views of a typical injection mold are shown in FIGS. 1 to 3. A stationary (or lower) mold half 20 is typically fixed and a movable (or upper) mold half 29, shown in cross-sectional cutaway, is normally moved into contact with the stationary mold half 20. A mold cavity 18 is usually divided between each mold half and the complete mold cavity is formed when the two mold halves are forced together.

The plastic, or other material to be molded, is forced through an injection nozzle, not shown, into the cavity after the mold is closed. The two mold halves are then moved apart and the molded part removed.

As shown in the figures, the upper mold half includes a movable ejector plate 30 in which are mounted several ejector pins 22. When the mold halves are closed, the ejector pins 22 contact the face of the lower mold half 20, forcing the ejector plate 30 in a direction away from the mold cavity 18 in the upper mold half 29.

The upper mold half 29 also includes a detection pin 27 which is mounted in the ejector plate 30 and is carried therewith. The pin 27 extends into the mold cavity 18 of the lower mold half 20 when the mold is closed and is aligned with an insert 25 which is the insert to be detected out of tolerance. The detector pin assembly includes a detector for determining movement of the detector pin 27. In the illustrated example, it is shown as a fiber optic transceiver 202 positioned in line with a reflective portion 201 of the detector pin 27.

The optical fiber transceiver 202 includes a light source which is directed toward the detector pin and a light sensor which detects reflected light. When the detector is urged into its extended position by the force of a spring 28, the reflective portion 201 is aligned with the optical fiber transceiver 202. When the detector pin is forced against the spring 28, the reflective portion is moved out of alignment with the transceiver 202, altering the latter's output signal.

Although shown as an optical detector, the detector for sensing movement of the detector pin 27 can be implemented in various other ways considered to be well known in the art. For example, it can comprise an LED (light-emitting diode) housed with a photodiode, the latter detecting the light from the LED reflected from the reflective portion 201. It can also be simply a microswitch. Furthermore, the placement of the detector is not restricted to the ejector plate as shown, but can be mounted in any feasible position.

A microswitch 23, or other similar device, is located in the lower mold half 20 in a position to be contacted by one of the ejector pins 22 when the mold is closed. The closing of the microswitch 23 supplies an ejector return signal.

The detector pin 27 and the microswitch 23 are arranged so that when the mold is closed with the insert 25 in the correct position, the ejector return signal will be supplied before the signal from the detector pin movement sensor, called subsequently the detector signal. If, as the mold is closed, the ejector signal occurs prior to the detector signal, the mold will close normally and the molding process will be completed.

If the detector signal occurs prior to the ejector return signal, it indicates that the insert is not in the correct position and could cause tool damage. This detected sequence can be used to cause the mold to open.

The spring resistance of the detection pin is made very light, typically in the range from 5 to 10 lbs., thereby furnishing protection for tool detail and fragile inserts.

The operation of the invention is illustrated in FIGS. 1 to 3. In FIG. 1, the mold halves are shown in the separated position. The detector 202 is supplying a signal indicating that the detector pin has not moved from the extended position, being held in that position by the force of the spring 28. An insert 25 is shown in the lower mold cavity 18. The ejector pins do not contact the lower mold half 20.

FIG. 2 shows the mold halves in the closed position. One of the ejector pins 22 has operated the microswitch 23. This is followed by movement of detector pin 27 to shift reflector 201 out of alignment with detector 202. This sequence establishes that an insert 25 is properly placed. Alternatively, it is acceptable to use an arrangement wherein detector pin 27 does not move after switch 23 is operated although this provides no indication that an insert 25 is in place. Contact of the ejector pins 22 with the face of the lower mold half 20 moves the ejector plate 30 relative to the interior of mold half 29, carrying the detector pin 27 with it.

FIG. 3 shows the situation where the insert is incorrect because two inserts have been placed in the cavity instead of only one. The mold has not closed sufficiently for the ejector pin 22 to have actuated the switch 23 but the detector pin 27 has contacted the oversized insert 25, causing the detector pin 27 to be forced against the spring 28 so that the sensor 202 supplies a signal that the detector has been moved. Since this occurs before the activation of the switch 23, it indicates that the insert is not correct and that mold damage can occur.

From the operation as illustrated in FIGS. 1 to 3, it is apparent that the only pressure requirement for sensing a mislocated or double-loaded insert is the force of the spring 28.

Figure 4:
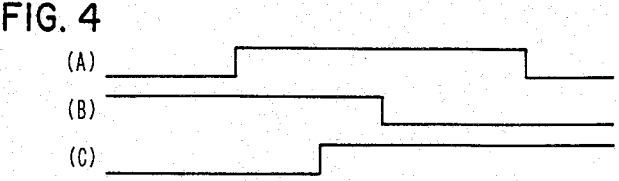
FIG. 4 is a timing diagram showing the relative time occurrences of various signals during correct operation, i.e., when the mold insert is properly positioned.

For a normal closing operation, the signals will be related as shown in FIG. 4. The signal in FIG. 4(A) is the mold closing signal which operates the apparatus which closes the movable half of the mold onto the stationary half. The signal from the switch 23 is shown in FIG. 4(C) and that from the optical detector 202 is shown in FIG. 4(B). As the mold closes, the switch 23 closes first and the optical sensor signal subsequently changes. This allows the mold operating apparatus to function to continue to close the mold until a mold closed signal is supplied by a suitable switch means, not shown, when the mold halves are in the proper mold closed position.

Figure 5:
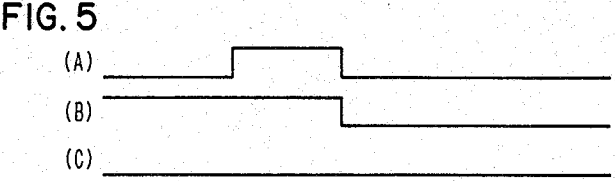
FIG. 5 is a timing diagram showing the relative time occurrences of various signals during incorrect operation, i.e., when the mold insert is improperly positioned.

In the event, however, that the signal from the optical detector 202 changes before the switch 23 closes, the mold close signal is terminated or inhibited. FIG. 5 shows the same signals as FIG. 4 except the detector signal 5(B) occurs before the switch 23 signal. The closing signal 5(A) is inhibited or terminated by the detector signal 5(B) change in the absence of the ejector signal 5(C).

Figure 6:
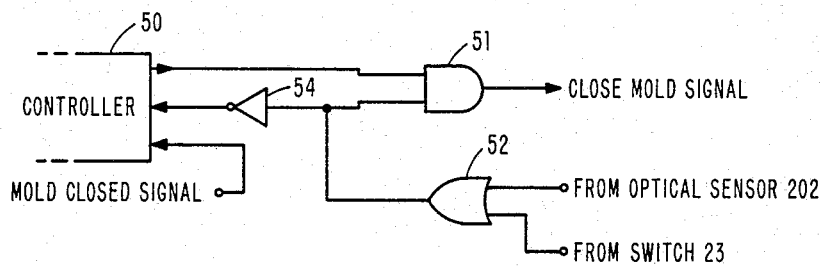
FIG. 6 is a logic diagram of a circuit for use with the invention.

A circuit for sensing the sequence of switch closures is shown in FIG. 6. A controller 50 supplies a mold close signal at the proper time in a molding operation. The signal is passed through an AND gate 51, the other input terminal of which is controlled by the output signal from an OR gate 52. The AND gate 51 passes the CLOSE MOLD SIGNAL so long as the OR gate 52 is activated. Since the optical detector is, in this illustration, providing a high signal while detecting the reflective area 201 on the detector pin 27, the OR gate 52 is activated while the detector pin 27 is in the extended position. If the switch 23 closes, supplying a high signal to the OR gate 52 before the high signal from the optical detector 202 is removed, the AND gate 51 continues to pass the close command signal from the controller 50.

The controller senses a MOLD CLOSED signal from a suitably mounted switch disposed to close when the mold halves are completely closed. This signal will cause the controller 50 to remove the command signal and to continue with the mold control process. If the detector pin 27 is moved to cut off the signal from the optical detector 202 before the switch 23 closes, then the OR gate will be disabled—the signal from switch 23 is not yet activating the OR gate 52—and the close command signal is inhibited at the AND gate 51 immediately. An inverter 54 supplies a high signal to the controller 50 when the OR gate 52 is disabled so that the controller 50, detecting this signal while the command signal is still being supplied, terminates the closure command signal and supplies an appropriate error signal and indication. It can also supply a mold open signal to move the mold halves apart.

The invention can be extended to the detection of several incorrectly placed inserts in one or more molds. The use of a controller allows the system not only to detect whether one or more inserts are incorrectly placed but also to identify the incorrectly placed inserts.

Figure 7:
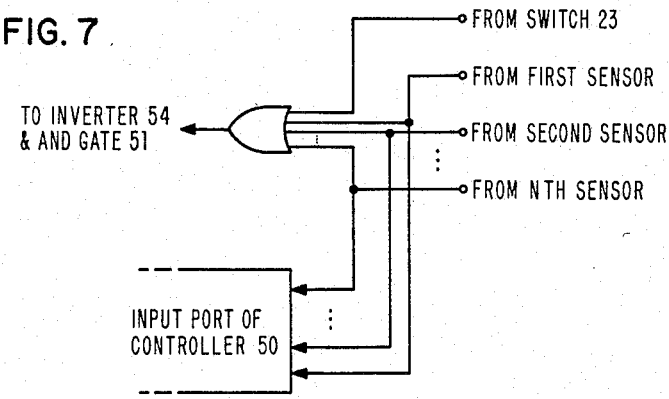
FIG. 7 is a modification of the circuit shown in FIG. 6 for use with multiple detectors.

FIG. 7 shows the modification to the circuit of FIG. 6 to detect and to identify one or more incorrectly placed inserts in a molding operation employing several inserts. The OR gate 52 has additional input terminals, each connected to the detector or sensor associated with each insert according to the invention. These detector signals are also coupled to separate terminals of an input port of the controller 50 of FIG. 6. When an incorrectly placed insert is detected as explained above, the controller can scan the terminals of the input port to determine which of the sensors or detectors is supplying the signal that occurred prior to the signal indicating the activation of the switch 23.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. In an injection molding apparatus having first and second mold cavity-forming elements movable between open and closed positions and insert means placed into the mold cavity of said first element when said elements are in the open position, the improvement comprising:
    plunger means mounted within said second cavity-forming element;
    resilient biasing means for retaining said plunger means in an orientation for engaging said insert in said first element before closure is completed by said elements;
    means for detecting movement of said plunger means as said elements close; and
    means responsive to said detecting means for indicating whether movement of said plunger means exceeded a predetermined value before said elements reached the closed position.

2. The invention as claimed in claim 1 wherein said indicating means includes:
    switch means operable upon complete closure of said first and second cavity-forming elements for providing a signal; and
    means responsive to said signal and to said movement detecting means for determining the sequence of element closure and movement of said plunger means.

3. A system for indicating incorrectly placed inserts in a molding apparatus, the molding apparatus having two or more mold elements which close to form a closed cavity and inserts placed within said cavities, comprising, in combination:
    means for supplying a closure command signal;
    movement detector means for supplying a first signal indicating that an insert has been detected;
    closure detector means for supplying a second signal for indicating that the mold elements have closed;
    sequence detector means for supplying a correct sequence signal when said second signal occurs before said first signal; and
    gate means responsive to said closure command signal and to said correct sequence signal for supplying a signal to cause said elements to close.

4. The invention as claimed in claim 3 wherein said movement detector means comprises:
    plunger means oriented to engage one of said inserts for moving in response to contact with said one of said inserts; and
    detector means disposed adjacent said plunger means for supplying said first signal when said plunger means has moved a predetermined distance.

5. A system for indicating incorrectly placed inserts in a molding apparatus, the molding apparatus having two or more mold elements which close to form one or more closed cavities and a plurality of inserts, each placed within selected ones of said cavities, comprising, in combination:
    controller means for supplying a closure command signal and having an input port means comprising a plurality of terminals;
    a plurality of movement detector means, each associated with a separate one of said plurality of inserts, for supplying a plurality of first signals indicating that at least one of said associated ones of said plurality of inserts has been detected;
    closure detector means for supplying a second signal for indicating that the mold elements have closed;

sequence detector means for supplying a correct sequence signal when said second signal occurs before any one of said first signals;
gate means responsive to said closure command signal and to said correct sequence signal for supplying a signal to cause said elements to close; and
means for coupling each of said plurality of first signals to a separate one of said input port terminals.

6. The invention as claimed in claim 5 wherein said movement detector means comprises:

a plurality of plunger means each oriented to engage a separate one of said plurality of inserts for moving in response to contact with said one of said inserts; and
a plurality of detector means, each disposed adjacent a separate one of said plurality of plunger means, for supplying said first signal when at least one of said plunger means has moved a predetermined distance.

* * * * *